United States Patent
Aimangala Nagaraja Setty et al.

(10) Patent No.: US 12,363,138 B2
(45) Date of Patent: Jul. 15, 2025

(54) DYNAMIC ADAPTION OF ARW MANAGEMENT WITH ENHANCED SECURITY

(71) Applicant: Intel Corporation, Santa Clara, CA (US)

(72) Inventors: Ravikumar Aimangala Nagaraja Setty, Bangalore (IN); Rajakumar Chidambaram, Bangalore (IN); Balaji Chintalapalle, Bengaluru (IN); Deepak Khandelwal, Bangalore (IN); Joy Devassykutty Pullokaran, Bangalore (IN); Joseph Maria Jaison Vincent Solomon, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 553 days.

(21) Appl. No.: 17/694,230

(22) Filed: Mar. 14, 2022

(65) Prior Publication Data

US 2022/0201020 A1    Jun. 23, 2022

(51) Int. Cl.
*H04L 9/40* (2022.01)

(52) U.S. Cl.
CPC ...... *H04L 63/1416* (2013.01); *H04L 63/0236* (2013.01); *H04L 63/0435* (2013.01); *H04L 63/1425* (2013.01); *H04L 63/145* (2013.01); *H04L 63/20* (2013.01)

(58) Field of Classification Search
CPC ............ H04L 63/1416; H04L 63/0236; H04L 63/0435; H04L 63/1425; H04L 63/145; H04L 63/20; H04L 63/164; H04L 63/1458; H04L 63/1466
See application file for complete search history.

(56) References Cited

U.S. PATENT DOCUMENTS

| | | | | |
|---|---|---|---|---|
| 2016/0182453 A1* | 6/2016 | Hu | ............. | H04L 63/164 726/13 |
| 2019/0238585 A1* | 8/2019 | Millman | ............. | H04L 63/1416 |
| 2021/0075730 A1* | 3/2021 | Palermo | ............. | H04L 47/624 |

OTHER PUBLICATIONS

Kent, s., IP Encapsulating Security Payload (ESP), 2005. (Year: 2005).*

(Continued)

*Primary Examiner* — Trong H Nguyen
(74) *Attorney, Agent, or Firm* — Compass IP Law PC

(57) ABSTRACT

Methods and apparatus for dynamic adaption of anti-replay window (ARW) management with enhanced security. According to aspects of the method, pre-ARW block employing a pre-ARW sliding window and an ARW block employing an ARW sliding window are maintained for an associated IPsec security association (SA). A determination is made to whether a received packet passes a pre-ARW check using the pre-ARW sliding window. When it does, the pre-ARW sliding window is advanced, encrypted content in the packet is decrypted, and processing is forwarded to the ARW block which performs an ARW check and advances the ARW sliding window when the ARW check is passed. Packets that do not pass the pre-ARW check may be buffered in queues and subsequently rechecked against the ARW sliding window. Under solutions provided herein, ARW checks and updates are decoupled from the decryption processes, enabling decryption to be performed in parallel and/or offloaded to a hardware accelerator.

24 Claims, 13 Drawing Sheets

(56) References Cited

OTHER PUBLICATIONS

Awadd, M., The Use of Dynamic Sliding Window with IPSec, 2014. (Year: 2014).*
Gouda et al., Anti-Replay Window Protocols for Secure IP, 2000. (Year: 2000).*
Kent, S., "IP Encapsulating Security Payload (ESP)", Network Working Group, Standards Track, Dec. 2005, 44 pages.
Wikepedia, "IPsec", https://en.wikipedia.org/wiki/IPsec, downloaded from the internet Apr. 5, 2023, 8 pages.

* cited by examiner

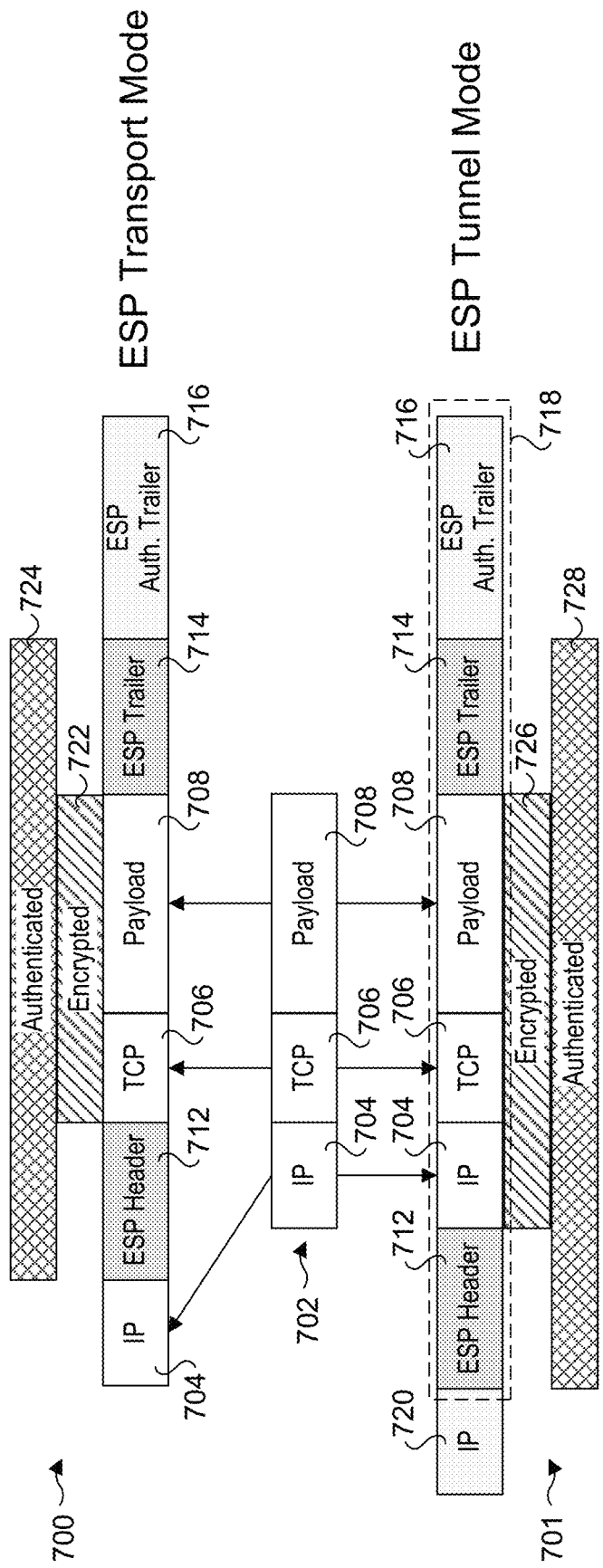
*Fig. 7* *(Prior Art)*

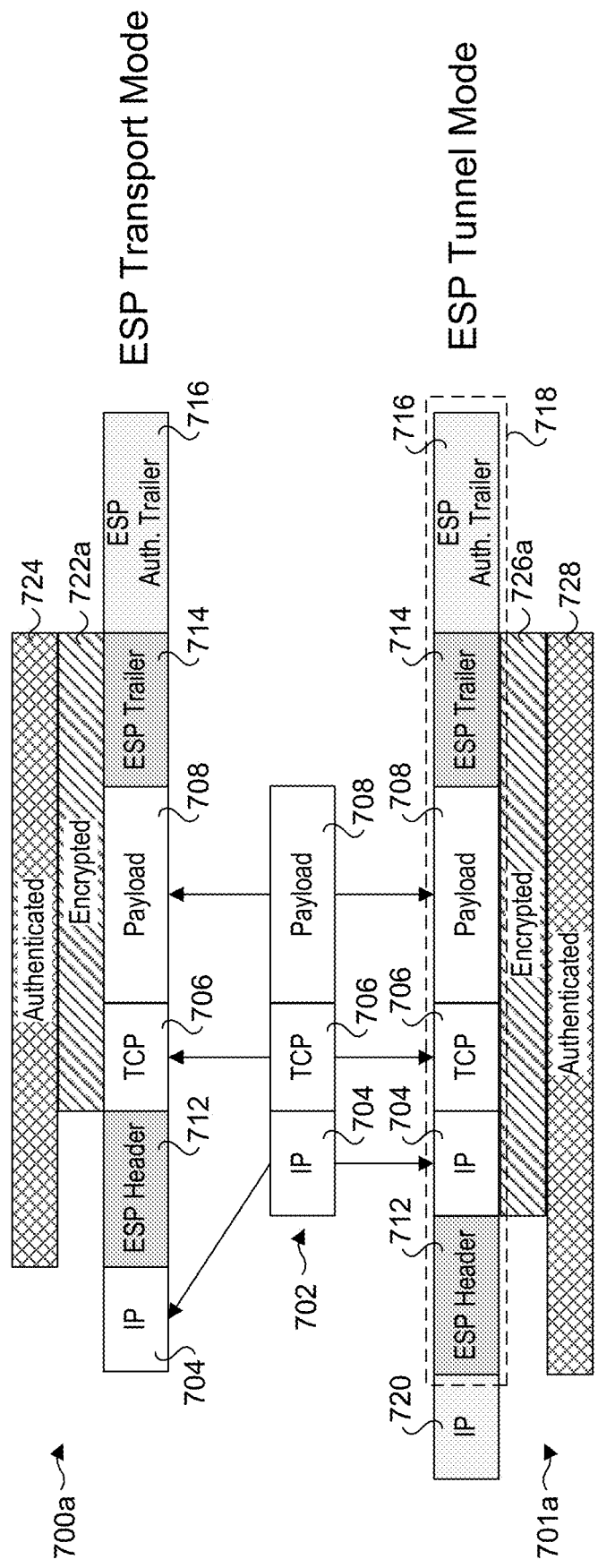
Fig. 7a *(Prior Art)*

DYNAMIC ADAPTION OF ARW MANAGEMENT WITH ENHANCED SECURITY

BACKGROUND INFORMATION

Online security has become increasing important in recent years. One way to address online security is to use encrypted transmissions. For example, many Web sites has changed from HTTP (Hypertext Transport Protocol) to HTTPS (Hypertext Transport Protocol Secure), which establishes shared session keys that enable support for encrypted messages to be exchanged between the client (e.g., user computer, laptop, mobile device, etc.) and the Web server.

Another approach is to use Internet Protocol Security (IPsec), which is a secure network protocol suite that authenticates and encrypts packets of data to provide secure encrypted communication between two computers over an Internet Protocol network. It is used in virtual private networks (VPNs). The IPsec has an optional Anti Replay Window (ARW) mechanism that identifies duplicates and late arriving packets. This mechanism helps in identifying Denial of Service (DOS) attacks. Under some current implementations, ARW processing functionality is spread before and after the decryption process, which mandates the entire processing block to be atomic and thus is performance intensive. Under an alternate approach the ARW functionality is performed after decryption to get better performance. However, this approach is more prone to security attack to the system.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 7 is a diagram illustrating the formats of an ESP transport mode packet and an ESP tunnel mode packet;

FIG. 7*a* is a diagram illustrating alternate formats for an ESP transport mode packet and an ESP tunnel mode packet;

DETAILED DESCRIPTION

Figure 1:
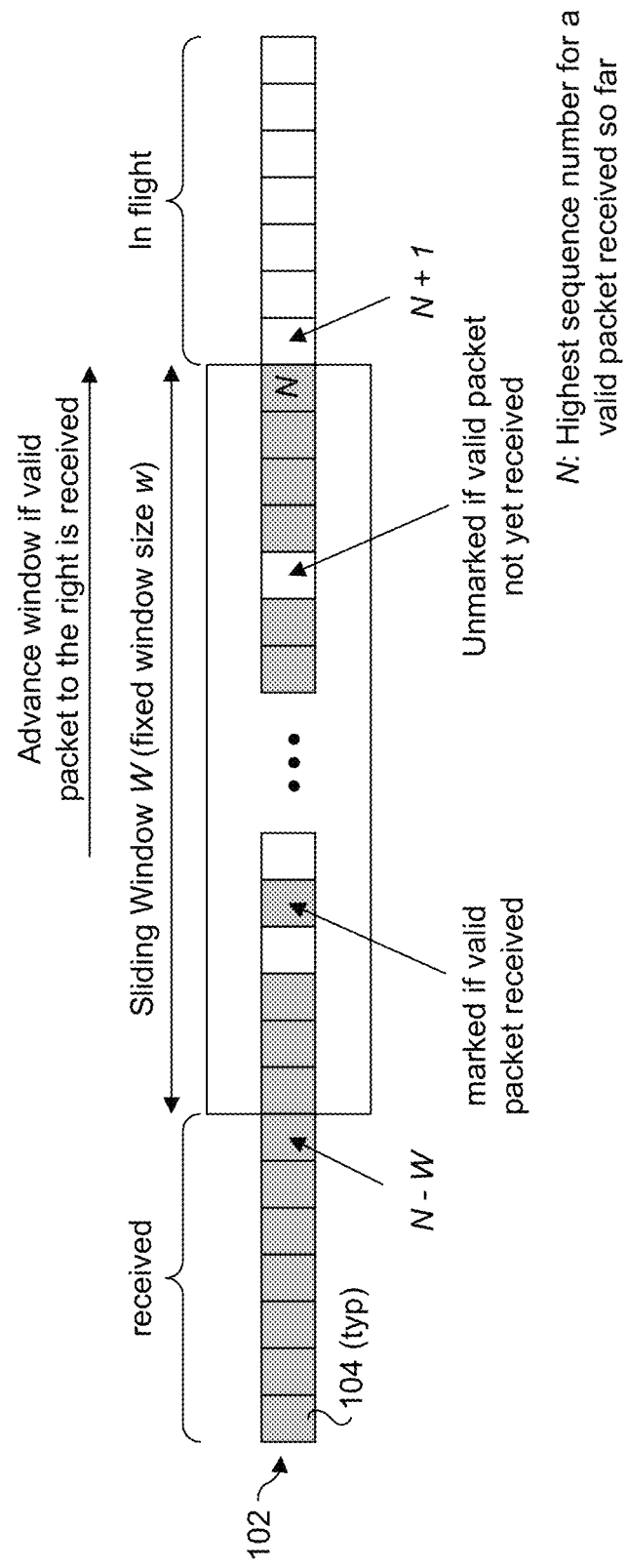
FIG. 1 is a diagram illustrating the use of a sliding window under a conventional implementation of an ARW.

Embodiments of methods and apparatus for dynamic adaption of ARW management with enhanced security are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

As used herein, "Atomic" processing or operation ensures that packets belonging to a single logical flow are processed sequentially in the ATOMIC Block irrespective of number of processing engines available. Atomic processing or operations are performed in an atomic block. "Ordered" processing allows packets from a single flow to be processed in parallel, if multiple processing engines are available; however, the scheduler must ensure that on egress the packets are returned in the order the packets were received.

In accordance with aspects of the embodiments disclosed herein, a new IPSec packet processing model is provided that decouples sequence number verification and associated operations for ARW update into two separate atomic blocks. This enables decryption to be performed in parallel, resulting in improved performance and improved resource utilization.

Generally, systems have less cryptographic processing capacity than network IO bandwidth. As a result, cryptographic processing blocks (e.g., decryption blocks) are more prone to DOS attacks. The embodiments of the IPSec ARW solutions disclosed herein protect cryptographic processing blocks by dropping duplicate and out of window packets before entering the decryption block.

Diagram 100 of FIG. 1 illustrates how the ARW is implemented under the ARW sub-protocol of the IPsec standards. A packet flow 102 of packets 104 is received at a device configured to implement IPsec. IPsec is implemented in Layer 3 of the OSI (Open Systems Interconnection) model. Under one common approach, Layer 3 and above are implemented in software on the device as part of the network stack, while Layer 1 (PHY—Physical) and Layer 2 (Media Access Control—MAC) operations are implemented in hardware, such as by a network adaptor, network interface controller (NIC), etc. As Ethernet frames are received, PHY and MAC layer operations are performed at the hardware level and the IP packet extracted from the Ethernet frame is written to a buffer in system memory that is accessed by an operating system component used to implement the network stack.

IPsec employs a Sequence Number in the applicable IPsec header, which as illustrated and described below may comprise an Authentication Header (AH) or an Encapsulating Security Payload (ESP) Header. In a packet flow, the packets are sent sequentially from a source device (the sending device). Normally, when packets are routed/forwarded as flows, the receive order will be the same as the send order (recognizing that some packets may be dropped in some cases). Under implementation of an IPsec ARW, the sequence numbers of the packets (and their corresponding slots in the ARW array) are in order. It is noted that the IPsec sequence numbers are separate and apart from sequence numbers employed by the Transmission Control Protocol (TCP) that is widely used for data transmissions over networks.

IPsec employs a sliding window W, having a fixed size w (default of 64). In this illustration, packets at the left-hand side of window W have been received, while packet to the right are "inflight." The packets within window W are numbered N−W+1 to N, where N and W are integers.

If a received packet falls in window W, if it is authenticated and unmarked (meaning a packet having the same sequence number has not been previously received) the packet is marked. When IPsec employs both authentication and encryption, the packet would be authenticated and decrypted prior to determining whether to mark the packet or not. If the packet is already marked, it is a replay packet that is dropped. Slots in the sequence number order for the ARW for which valid packets have yet to be received are unmarked, as shown in FIG. 1.

If the received packet sequence number is >N and the packet is determined to be authentic (valid), the packet is marked, and window W is advanced based on sequence number such that the received packet (as identified by its sequence number) is at the right edge of window W. When authentication and encryption is used, a valid packet is both authenticated and successfully decrypted. If the received packet has a sequence number less than or equal to N−W, it is not within window W and the packet is discarded. In the case of packet loss or out of order over the network, window W may be advanced more than one slot.

Figure 2:
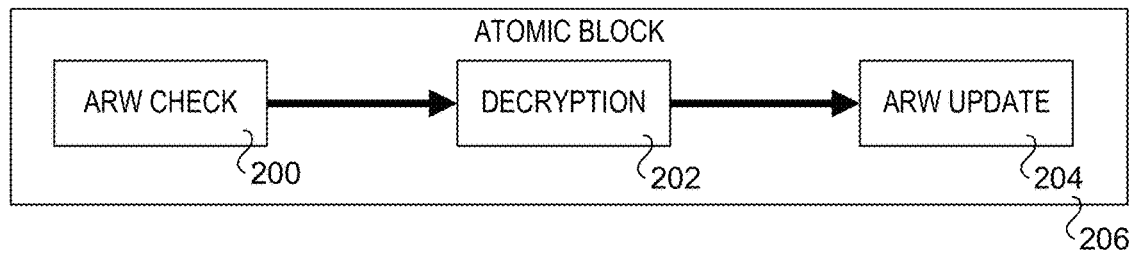
FIG. 2 is a diagram illustrating implementing an ARW check, decryption, and ARW update in a second atomic block under a current approach.

Under one currently used approach shown in FIG. 2, on receiving an IPsec packet a sequence number in the ESP header is verified to ensure it is in the acceptable window range using an ARW check block 200. If it is in the valid range, the packet is decrypted, as shown in a decryption block 202. If packet is decrypted successfully, the anti-replay window is updated, as shown by an ARW update block 204. As further shown in FIG. 2, the operations in blocks 200, 202, and 204 are part of a single atomic operation 206.

For an example comparison of the CPU cycles used by blocks 200, 202, and 204, the operations of ARW check block 200 and ARW update block 204 take approximately 100 CPU (clock) cycles, while the decryption process performed in decryption block 202 takes approximately 1000 CPU cycles, resulting in approximately 1200 CPU cycles for the overall atomic block 202 processing. The proceeding number of CPU cycles is merely illustrative of relative values, and under an actual implementation the CPU cycles will vary under different software implementations and hardware; however, decryption will generally take significantly longer than the ARW check and ARW update when all operations are implemented in software.

Figure 3:
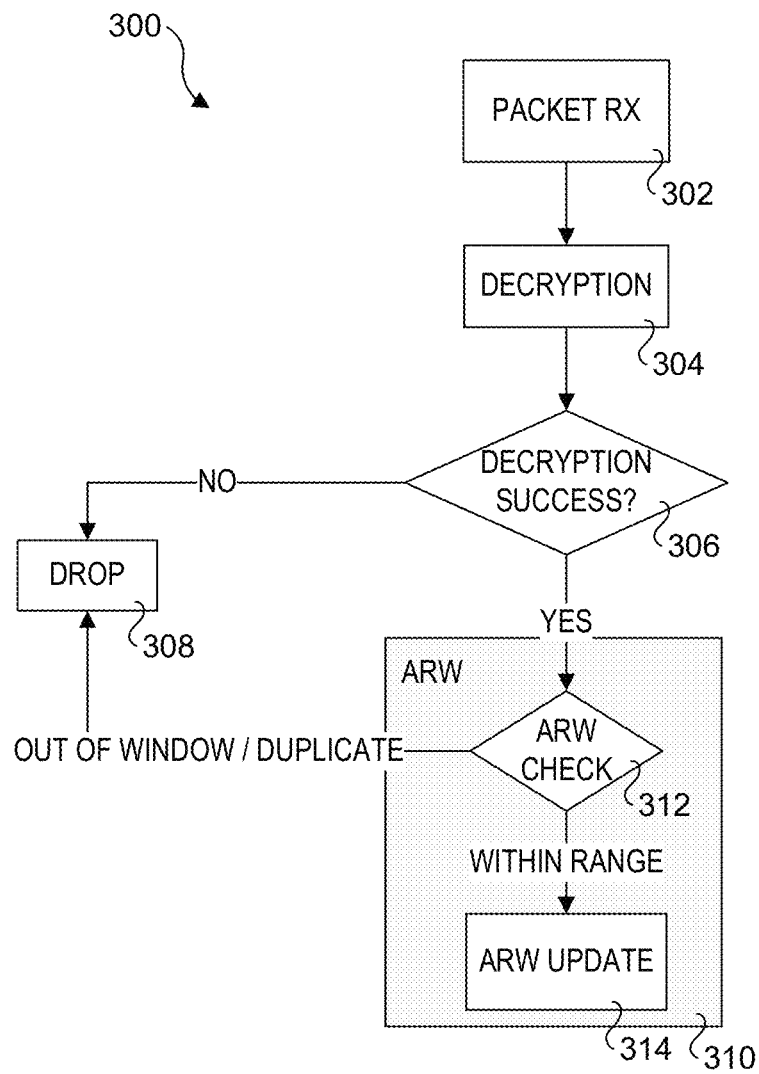
FIG. 3 is a flowchart illustrating operations and logic for processing IPsec packets using a current approach.

Flowchart 300 FIG. 3 shows an example of an alternate conventional approach for implementing IPsec with ARW support. A received packet 302 (extracted from an Ethernet frame following PHY/MAC hardware operations) is decrypted in a decryption block 304. In a decision block 306 a determination is made to whether the decryption is successful. If the answer is NO, the logic proceeds to drop the packet, as shown in a block 308. If the answer is YES, the logic proceeds to an ARW block 310 that includes a decision block 312 indicating the outcome of an ARW check. If the packet is out of window W or a duplicate packet, the packet is dropped. If the packet is within the range of window W, the ARW sliding window W is updated (slid to the right) in a block 314.

Under the approach shown in FIG. 3, a DOS attack can happen on the decryption block since it precedes the remaining operations. In other words, since decryption block 304 precedes ARW block 310, any DOS attack would need to be detected following decryption of the DOS packets.

In accordance with an aspect of the improved ARW embodiments disclosed herein, sequence number verification and ARW update is decoupled from the decryption process, which may be performed in parallel and/or off-loaded to a hardware accelerator. Under one embodiment, sequence number verification and ARW update are executed as atomic processes.

Figure 4:
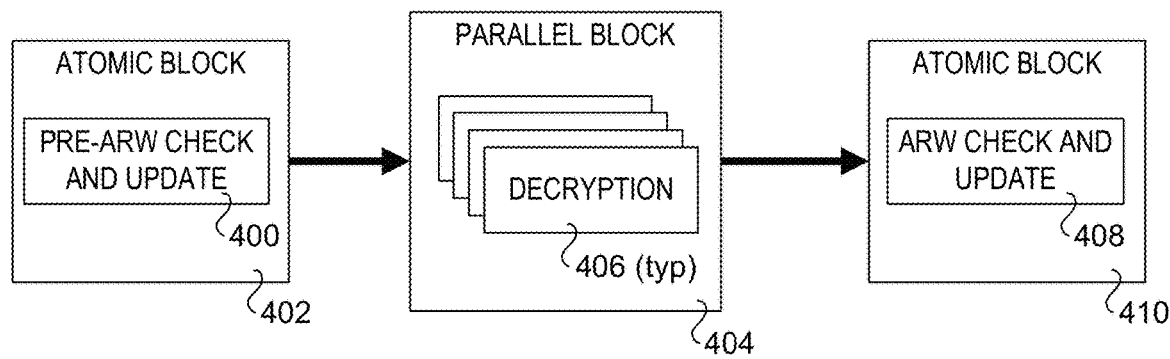
FIG. 4 is a flowchart illustrating the decoupling of the decryption process from a pre-ARW check and update and a ARW check and update, which are implemented in respective atomic blocks.

A high-level block diagram illustrating an example of this approach is shown in FIG. 4. As depicted by a pre-ARW check and update block 400 in a first atomic block 400, pre-ARW processing including a pre-ARW check and pre-ARW update are performed. Packets that pass the criteria of pre-ARW check and update block 400 are forwarded to a parallel block 404 to be decrypted by one of parallel decryption blocks 406. Once successfully decrypted, the decrypted packets are forwarded to an ARW check and update block 408 in a second atomic block 410. As the "atomic" and "parallel" block names imply, the operations in pre-ARW check and update block 400 and the operations in ARW check and update block 408 are performed using atomic operations, while decryption blocks 406 are implemented in parallel and are decoupled from pre-ARW check and update block 400 and ARW check and update block 408.

Under the approach shown in FIG. 4, the pre-ARW processing will catch the duplicate and out of window packets before they are forwarded to be decrypted, which saves decryption resources (such as CPU cycle or accelerator cycles) by dropping packets before they are decrypted. In addition, conventional ARW check operations are performed in accordance with IPsec standards such that the improved ARW solution remains compliant with applicable IPsec standards.

In one embodiment, pre-ARW check and update block 400 maintains its own pre-ARW state information (per flow) to handle errant packets (either duplicate packets or out of window packets). This pre-ARW state information in pre-ARW check and update block 400 is periodically synced with the latest ARW information in ARW check and update block 408.

Figure 5:
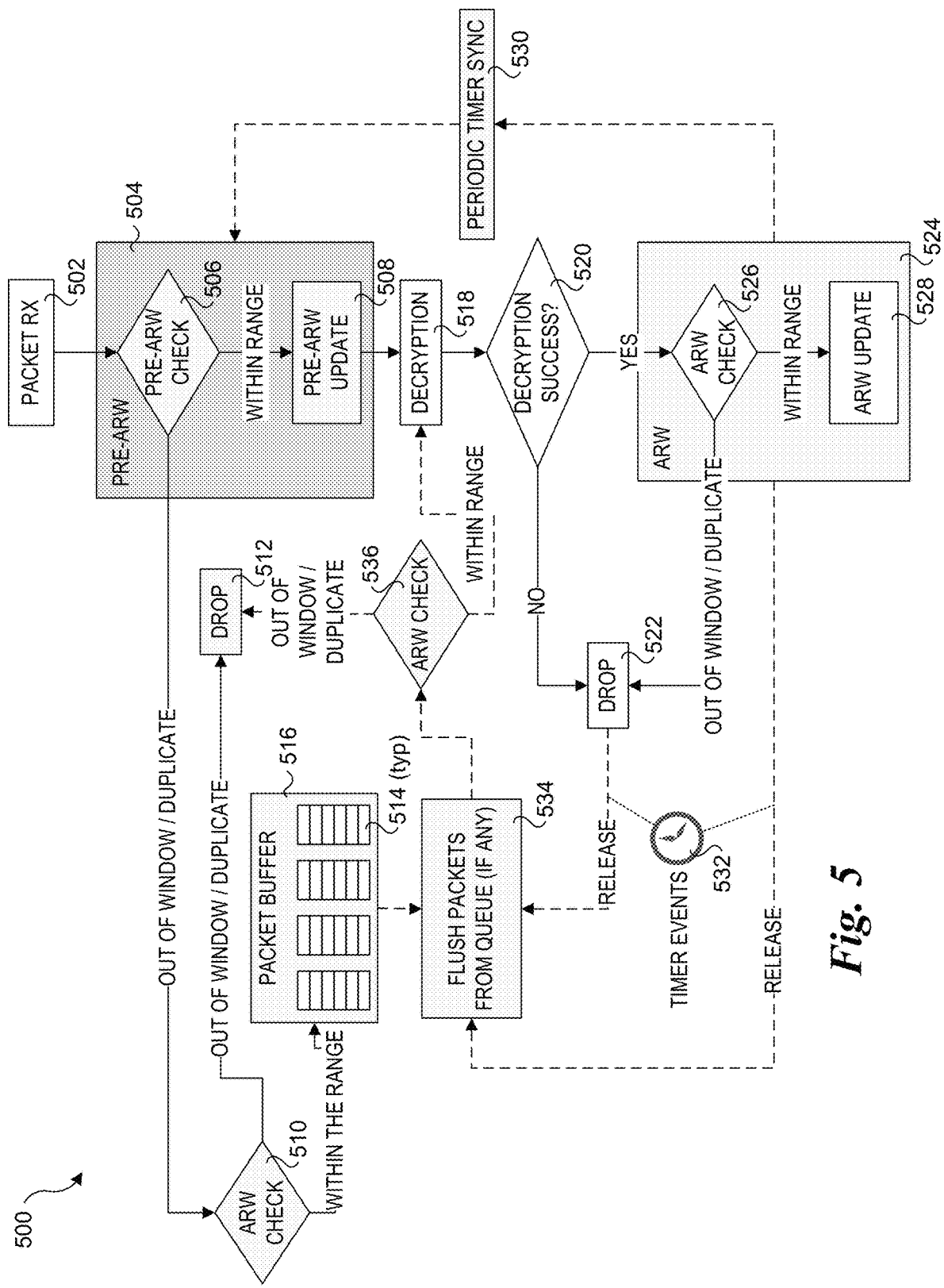
FIG. 5 is a flowchart illustrating operations and logic for processing packets including content that is decrypted in accordance with an Ipsec protocol, according to one embodiment.

FIG. 5 show a flowchart 500 illustrating operations and logic for implementing the improved ARW processing solution, according to one embodiment. The flow begins with a received packet 502. As before, PHY and MAC layer processing will first be performed to extract received packet 502 from an Ethernet frame prior to forwarding the packet to IPsec operations in Layer 3. The flow includes a pre-ARW block 504 including a pre-ARW check performed in a decision block 506. The pre-ARW check is a pre-decryption check where the sequence number is checked against a pre-ARW window, which is implemented as part of a pre-ARW block 504. If the packet is determined to be a valid packet, the pre ARW window is updated, and the packet is forwarded for decryption. If the packet is a duplicate or out of window packet, it is forwarded to the local buffering logic.

In further detail, if the sequence number for the packet is within the pre-ARW window (referred to window PW in the figures below), the logic proceeds to a pre-ARW update block 508 in which the pre-ARW window PW is updated.

The local buffering logic performs an ARW check against the "real" ARW window W, as depicted by a decision block 510. If the sequence number is out of window W or a duplicate, the packet is dropped, as shown in a block 512. If the sequence number is within the range of window W, it is buffered in a queue 514 in packet buffer 516. In one embodiment queues 514 are implemented at First-in, First-out (FIFO) queues. In one embodiment, queues 514 employ a tail drop mechanism to drop packets.

In one embodiment, pre-ARW block 504 will maintain a pre-ARW window per IPsec Security Association (SA). Similarly, a respective queue 514 in packet buffer 516 will be created per SA. The size of the queue is derived from the number of inflight packets across the decryption block and post decryption block (ARW block 524 described below).

Returning to pre-ARW block 504, following pre-ARW update block 508 packets that pass the pre-ARW check are forwarded for decryption in a decryption block 518. In a decision block 520 a determination is made to whether the decryption is successful. If not, the logic proceeds to drop the packet in a drop block 522. If the decryption is successful, the answer to decision block 520 is YES and the logic proceeds to perform ARW processing in ARW block 524 which includes performing an ARW check against window W in a decision block 526. If the sequence number is out of window W or a duplicate, the packet is dropped in drop block 524. If the sequence number is within the range of window W, an ARW update in performed in an ARW block 528, which results in window W being shifted to the right.

Generally, the decryption processing in decryption block 518 can be implemented in software or hardware (e.g., offloaded to a hardware-based accelerator or the like). In one embodiment, decryption status is sent as metadata along with the packet to decision block 520 and ARW block 524.

If the packet is marked bad, the packet is dropped in drop block 522 and packet buffer 516 is checked for any packet in a queue 514 that is marked duplicate or out of window with respect to the currently dropped packet. If yes, those packets are flushed from the queue in block 534 and forwarded for decryption.

Timer Events

There is a periodic timer set up in the system, which has two main functions. A first function is to sync up the ARW window W with the pre-ARW window PW. This helps pre-ARW block 504 to make more accurate decisions before sending the packet to decryption block 520. As shown, a periodic timer sync 530 is performed by ARW block 524 and pre-ARW block 504 to sync the pre-ARW and the ARW windows.

The second function is to flush the packets enqueued in the packet buffer queues for more than an expected time. In one embodiment, queues 514 will be a single producer single consumer model queue. Enqueue will happen from pre-ARW block 504. Dequeue will be done from ARW block 524. In one embodiment, timer events will also be pinned to the ARW block core and will trigger flush of the queues (dequeue packets and send for decryption).

As shown, a timer events will trigger release signals from ARW block 524 and drop block 522 to flush packets (if any) from the queue 514 for the SA, as shown in a block 534. For each of the flushed packets, an ARW check is performed in a decision block 536 against ARW windows W. If the sequence number for the packet is out of window W or a duplicate, the packet is dropped in block 512. Otherwise, if the sequence number is within range of ARW window W, the logic flows to perform decryption in a decryption block 518.

Figure 6:
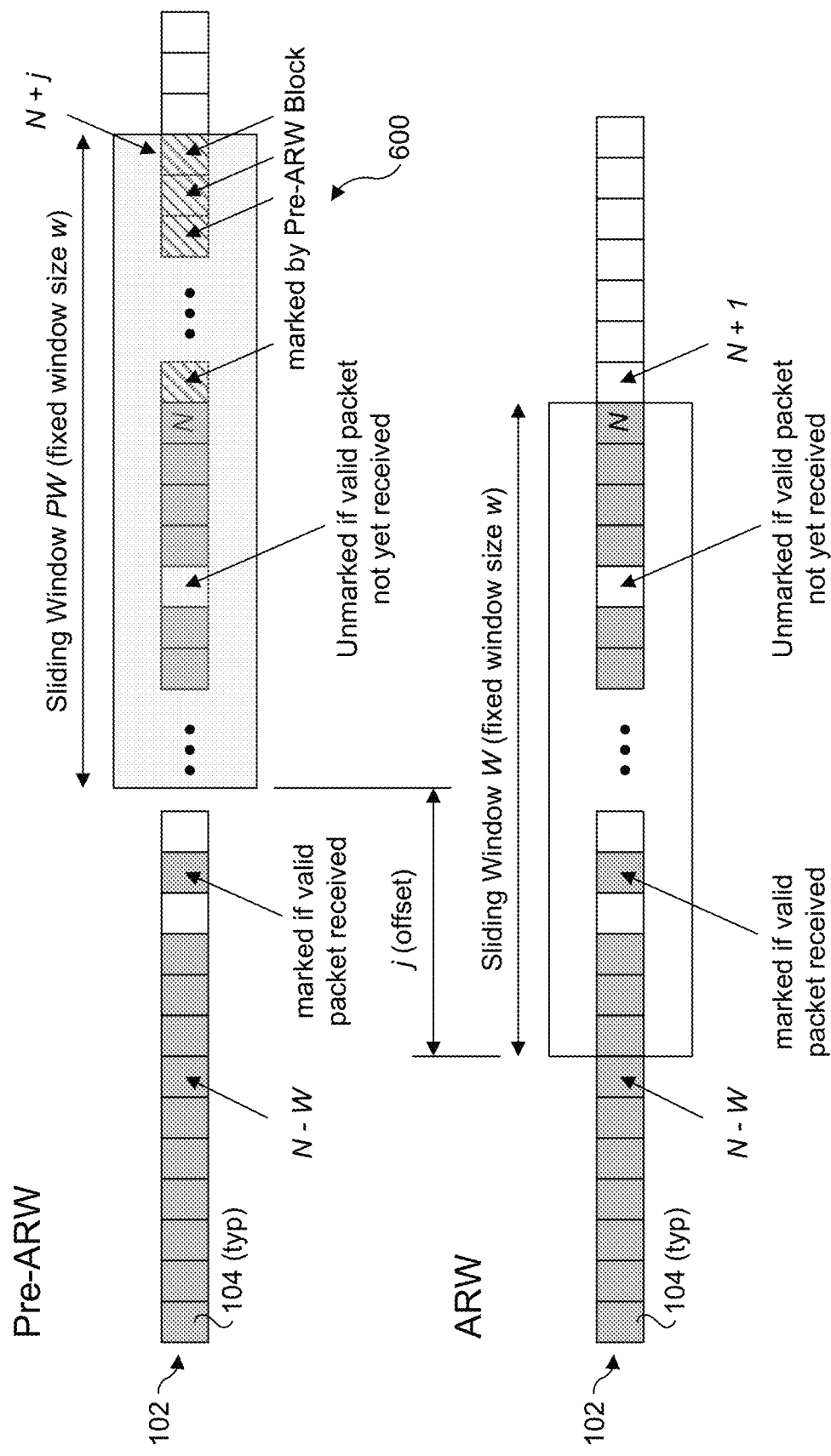
FIG. 6 is a diagram comparing the sliding window of a pre-ARW relative to the sliding window of an ARW.

FIG. 6 shows a comparison of a pre-ARW 600 with an ARW 602, the latter of which has the same structure as shown by ARW 100 in FIG. 1. Both pre-ARW 600 and ARW 602 are used to process the same packet flow 102, and both have a fixed window size that is the same. The difference is processing of pre-ARW 600 is ahead of ARW 602 by j packets, which represent a number of packets that will be received and processed by the pre-ARW block 504 prior to previously handled (by pre-ARW block 504) packets in packet flow 102 being processed by ARW block 524. (These are also referred to as inflight packets, with j representing that maximum number of inflight packets that are expected.) j may also correspond to the size of queues 514. As discussed above, the size of queues 514 is derived from the number of inflight packets across the decryption block (518) and post decryption block (ARW block 524). j will generally be derived as a function of the packet receive rate and the combined latency of decryption block 518 and ARW block 524 (which will correspond to the number of inflight packets across the decryption and post decryption blocks).

FIG. 7 shows the format of an ESP transport mode packet 700 and an ESP tunnel mode packet 701 according to associated IPsec standards/specifications. Each of these ESP packets begin with a standard IP/TCP packet, which includes an IP header 704, a TCP header 706, and a packet payload 708. ESP transport mode packet 700 begins with IP header 704 followed by an ESP header 712, TCP header 706, packet payload 708, an ESP trailer 714, and an ESP authentication trailer 716. These same fields in ESP tunnel mode packet 701 are encapsulated into a new IP packet 718 that is preceded by an outer IP header 720.

Under the formats illustrated in FIG. 7, ESP transport mode packet 700 and ESP tunnel mode packet 701 employ both encryption and authentication. However, an ESP transport mode packet may only employ encryption without authentication. Under ESP transport mode packet 700 and as depicted by an encryption block 722, the contents of TCP header 706 and packet payload 708 are encrypted using an ESP encryption algorithm that is specified by the SA. ESP header 712 includes a Security Parameters Index that is used to identify the SA of the receiving party. ESP trailer 714 comprises padding for encryption, to extend the payload data to a size that fits the encryption's cipher block size, and to align the next field, along with a type of next header and an integrity check value.

Authentication employs an authentication algorithm that produces a signed value that is written to ESP authentication trailer 716. As shown by an authentical block 724, the authentication algorithm is applied to a digest including ESP header 712, TCP header 706, packet payload 708, and ESP trailer 714.

Under ESP tunnel mode packet 701 and as depicted by an encryption block 726, the contents of IP header 704, TCP header 706, and packet payload 708 are encrypted using an ESP encryption algorithm that is specified by the SA. As shown by an authentication block 728, the authentication algorithm is applied to a digest including ESP header 712, IP header 704, TCP header 706, packet payload 708, and ESP trailer 714.

It is noted that there are separate IPsec specifications that define different combinations of fields over which encryption is performed. For example, under one IPsec specification the encrypted fields for the ESP transport and tunnel modes further include the ESP trailer field. This is shown in FIG. 7a, wherein an encryption block 722a for an ESP transit mode packet 700a and an encryption block 726a for an ESP tunnel mode packet 701a further include ESP trailer 714.

Figure 8:
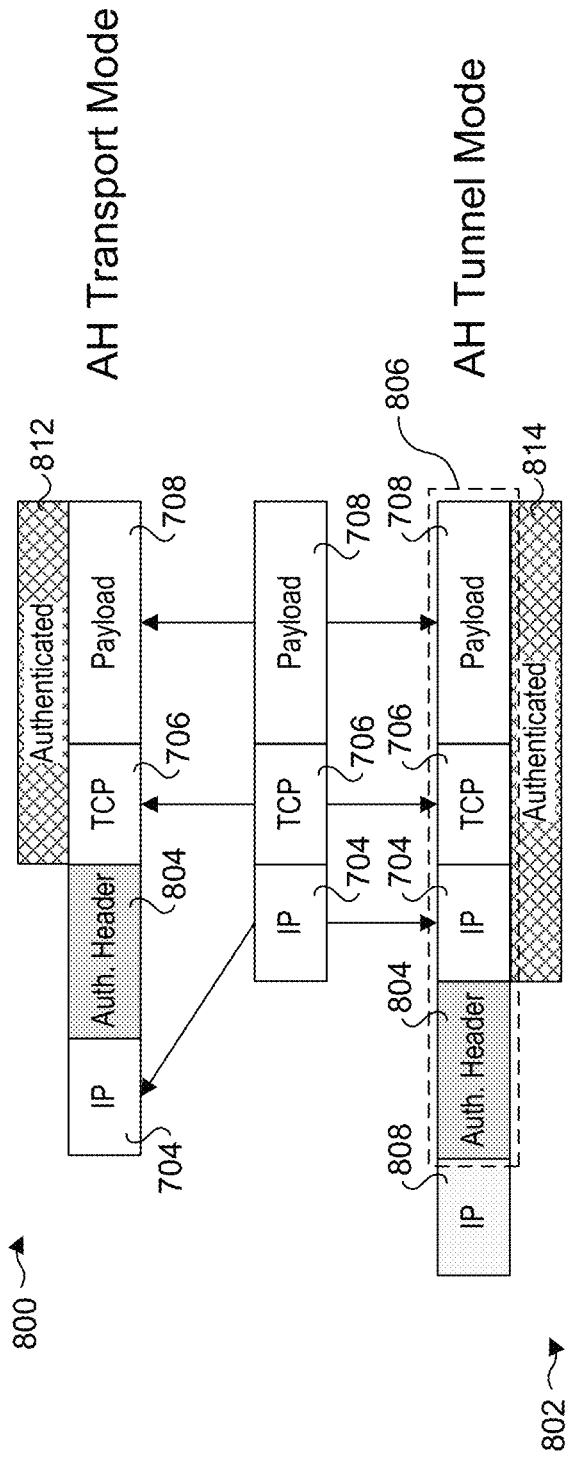
FIG. 8 is a diagram illustrating the formats of an AH transport mode packet and an AH tunnel mode packet.

The principles and teachings disclosed herein may also be applied to IPsec protocols employing Authentication Headers (AH). FIG. 8 shows the format of an AH transport mode packet 800 and an AH tunnel mode packet 802 according to associated IPsec standards/specifications. As before, each of these AH packets begin with a standard IP/TCP packet, which includes an IP header 704, a TCP header 706, and a packet payload 708. AH transport mode packet 800 begins with IP header 704 followed by an Authentication header 804, TCP header 706, and packet payload 708. These same fields in AH tunnel mode packet 802 are encapsulated into a new IP packet 806 that is preceded by an outer IP header 808. Under an alternative implementation, the authentication algorithm employs a digest of the entire packet beginning with the IP header to the last byte of payload for AH transport mode packet 800 and beginning with the outer IP header 808 for AH tunnel mode packet 802

AH transport mode packet 800 and AH tunnel mode packet 802 employ authentication without encryption. Under AH transport mode packet 800, the authentication algorithm is applied to a digest including TCP header 706 and 708, with the signed hash value (derived from the authentication algorithm using a shared secret key) being added to an Integrity Check Value (ICV) field in Authentication header 804. A similar approach is used for AH tunnel mode packet 802, except in this case the digest further includes IP header 704.

Figure 5A:
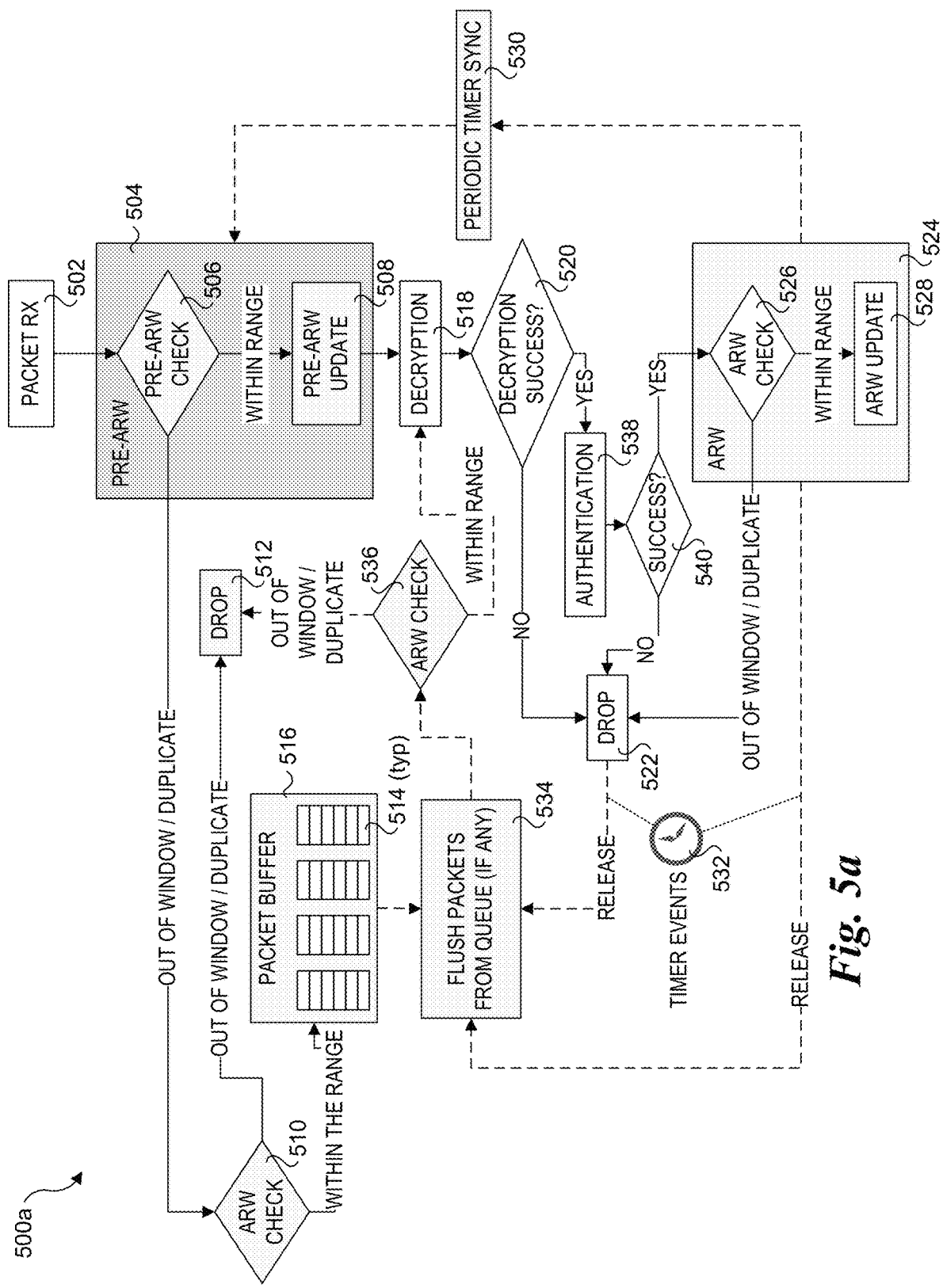
FIG. 5*a* is a flowchart illustrating a variant of the flowchart in FIG. 5 further employing an authentication check to support Ipsec protocols that employ both encryption and authentication.

Flowchart 500a in FIG. 5a shows a variant of flowchart 500 that further employs an authentication check. Following decision block 520, authentication is performed in a block 538. As shown by a decision block 540, if the authentication is successful, the logic proceeds to ARW block 524, while if the authentication is not successful the logic proceeds to drop the packet in drop block 522.

Figure 5B:
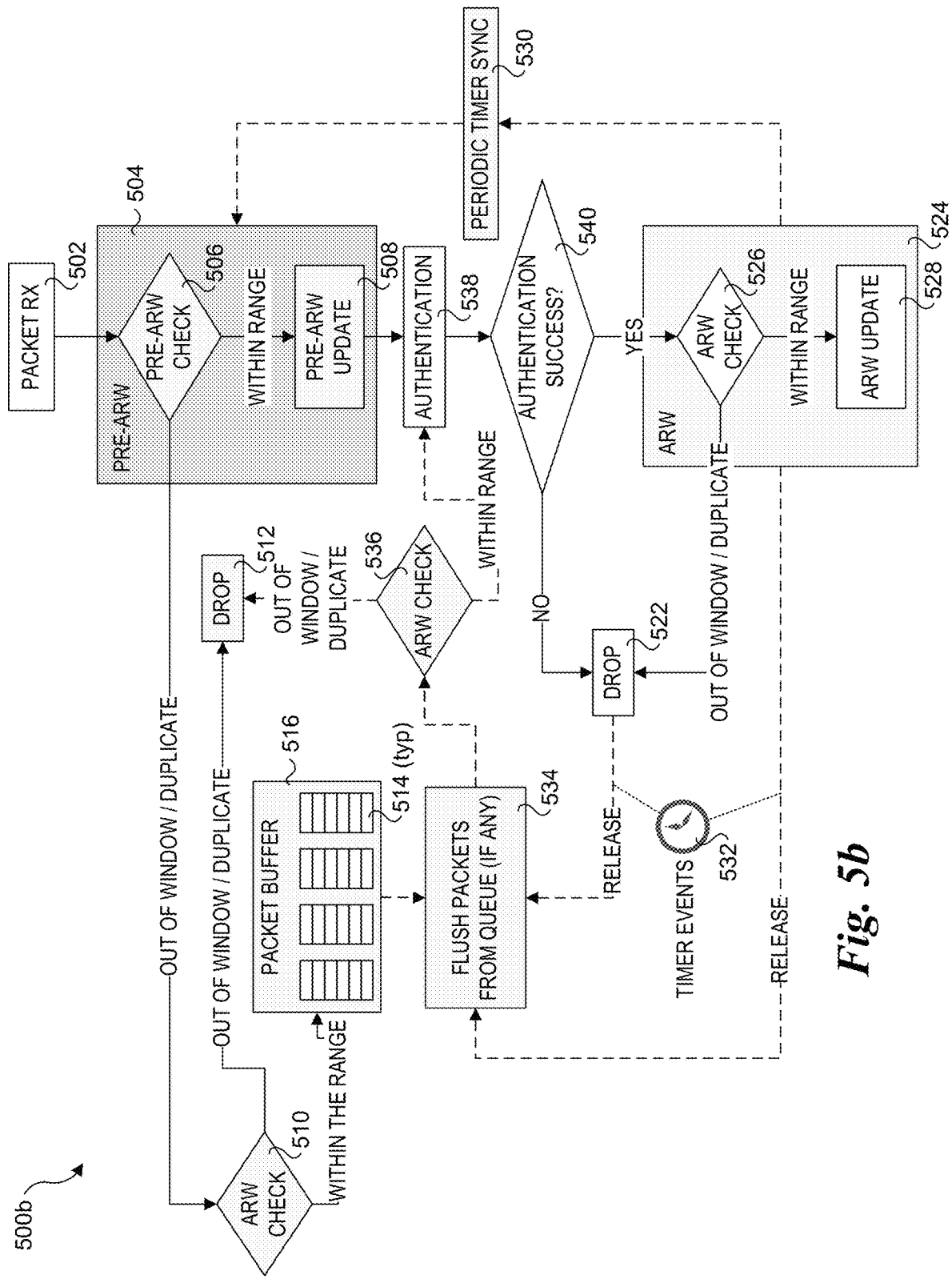
FIG. 5*b* is a flowchart illustrating operations and logic for processing packets including content that is authenticated without decryption in accordance with an Ipsec Authentication Header (AH) protocol, according to one embodiment.

Flowchart 500b in FIG. 5b shows a variant of flowchart 500 that replaces decryption block 518 and (decryption check) decision block 520 with authentication block 538 and (authentication check) decision block 540. The rest of the logic is essentially the same as shown by like-numbered blocks and components in FIGS. 5 and 5a. However, since authentication will generally take less CPU cycles than decryption (depending on the respective algorithms used for decryption and authentication), the predicted maximum number of inflight packets (j) will generally be less. As a result, the size of queues 514 and the offset between the pre-check ARW sliding window PW and the ARW sliding window W may be reduced.

Figure 9:
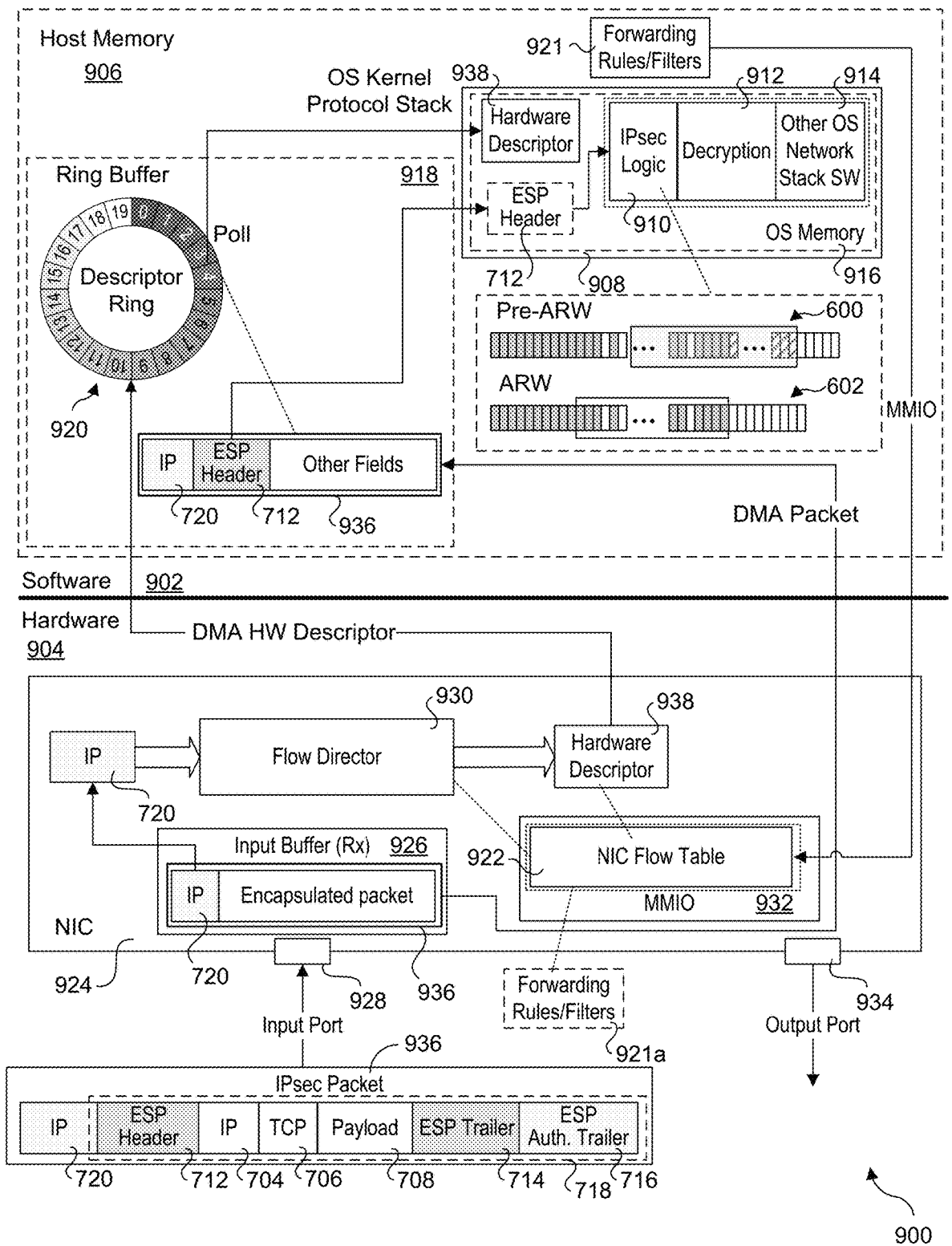
FIG. 9 is a schematic diagram illustrating a computer system architecture that may be used to implement aspects of the embodiments described herein.

Under the embodiments herein, the IPsec-related operations and logic may be implemented in software, in hardware, or a combination of software and hardware. FIG. 9 shows a system architecture 900 that may be used to implement the IPsec-related operations in software. System architecture 900 is logically partitioned into a software layer 902 and a hardware layer 904. Software layer 902 includes host memory 906 in which various software components are loaded prior to execution, such as during booting of a host platform and/or during ongoing runtime operations. Host memory 906 is also used to store data structures associated with the software and buffer various data, such as packet data. Some of the other components include operating system (OS) software blocks, including an OS kernel protocol stack 908.

OS kernel protocol stack 908 includes a software network stack that comprises various components for implementing software processing of OSI reference Layer 3 and above, as well as implementing various security-related packet processing operations, includes IPsec protocol processing operations. For illustrative purposes, the OS software components include IPsec logic 910, a decryption block 912, and other OS network stack software (SW) 914. IPsec logic 910 includes logic for implementing a pre-ARW 600 and an ARW 602. These OS software components are stored in a portion of host memory allocated to the operating system, as depicted by OS memory 916.

As an option, one or more of the foregoing OS software components may be implemented by a user space application using a user space library or the like, such as but not limited to the DPDK (Data Plane Development Kit) library or open data plane. Such user space libraries/applications may be configured in a similar manner to what is illustrated in FIG. 9, except the software components are implemented by an application in user space memory rather than an operating system in OS memory.

Under one non-limiting approach implemented by Linux OS, the kernel device driver for a NIC (not separately shown) maps a hardware descriptor ring in the NIC hardware, to a portion of host memory 906, via MMIO (Memory-Mapped Input-Output) access, to facilitate further communication between NIC hardware and NIC device driver over these hardware descriptors. Each ring buffer holds a number of hardware descriptors, carrying metadata about a particular packet and memory pointers to the actual packet header and packet payload information in ring buffer, such as depicted by a ring buffer 918. As illustrated in architecture 900, ring buffer 918 includes a descriptor ring 920. Typically, for every packet queue it maintains, the NIC device requires one transmit ring buffer for sending packets out of the system, and one receive ring buffer for accepting packets into the system from the network. Under a virtualized embodiment, separate ring buffers and descriptor rings may be allocated for separate OS instances running on virtual machines (VMs) or in containers in a similar manner to what is illustrated in FIG. 9.

OS kernel protocol stack 908 includes a memory buffer in which a host flow table is stored (not separately shown). The host flow table includes a set of forwarding rules and filters 921 that are used to for various operations, including packet/flow classification, forwarding, and other actions. In the embodiment illustrated in system architecture 900, a portion of the system memory address space is mapped to a MMIO write block that is used write information to communicate the selected entries of the host flow table to be cached in a NIC flow table 922 on a NIC 924 in hardware layer 904

NIC 924 is generally representative of a network hardware device that is used for performing hardware-based packet-processing operations associated with receiving packets from and transmitting packets to one or more networks to which ports on the NIC are connected. NIC 924 includes an input buffer 926 coupled to an input port 928. Although only a single input port 928 is shown, a NIC may include multiple input ports 928, each coupled to a respective input buffer 926. NIC 924 further includes a flow director block 930, MMIO address space 932, and one or more output ports 934.

During ongoing operations, selected entries from the host flow table are cached in a NIC flow table 922 via MMIO address space 932. In one embodiment, the selected entries are written to MMIO address space 932 via the MMIO write block in the NIC driver. Optionally, another software component (not shown) may be used to write selected entries from the host flow table into MC flow table 922 via MMIO block 932. As another option, the selected flow table entries are written to a portal address in MMIO address space 932, read from the portal address by logic on NIC 924, and cached in NIC flow table 922. NIC flow table 922 also caches a copy of the forwarding rules and filters 921, as depicted by forwarding rules and filters 921*a*

System architecture 900 further shows a process flow for handling an IPsec packet 936 comprising an ESP tunnel mode packet having the fields described and illustrated in ESP tunnel mode packet 701 in FIG. 7. IPsec packet 936 is received at input port 928 in an Ethernet frame, with PHY and MAC layer operations performed by PHY and MAC blocks coupled to input port 928 (not separately shown), which are used to extract IPsec packet 936 from the Ethernet frame and buffer IPsec packet 936 in a queue in input buffer 926. The outer IP header 720 is then read by flow director 930, which employs flow information in NIC flow table 922 to classify the flow of IPsec packet 936.

Flow director 930 generates a hardware descriptor 938 which is DMA'ed (written using a Direct Memory Access (DMA) transaction) to a slot on descriptor ring 920. A similar process is performed for each IPsec packet that is received in the IPsec packet flow, with hardware descriptors associated with respective received packets being generated and DMA'ed onto a respective slot on descriptor ring 920. In addition to DMA'ing hardware descriptor, the IPsec packets associated with those hardware descriptors are DMA'ed into buffers or queues in host memory 906, as depicted by IPsec packet 936.

As mentioned above, the hardware descriptor carries metadata about a particular (associated) packet and memory pointers to where the actual packet header and packet payload information is buffered in host memory 906. Various types of data structures may be used to buffer IPsec packets, as well as non-IPsec packets, as is known in the art.

The software executing in software layer 902 operates asynchronously relative to the hardware operations performed by NIC 924. The OS kernel protocol stack includes counters to manage processing of packets, such as head and tail pointers that are used to access descriptor ring 920. Accordingly, software in the OS kernel protocol stack will poll descriptor ring 920 for new hardware descriptors and pull the hardware descriptors off the descriptor ring to process them, as depicted by a hardware descriptor 938 in OS memory 916. The software will read metadata in hardware descriptor 938 and read ESP header 712 from IPsec packet 936 in the host memory buffer or queue pointed to by the metadata. At this point, IPsec logic 910 is implemented via execution of software on the host processor (not shown). Decryption may also be performed by decryption block 912 or, optionally, decryption operations may be offloaded to a hardware accelerator that is implemented on NIC 924 or on a separate card that is installed in the computer system (both not shown).

Generally, IPsec logic is representative of operations and logic for implementing the IPsec-related functionality described herein, including that shown in one or more of flowcharts 500, 500*a* and 500*b*. Moreover, under various embodiments, software-based IPsec operations may be used for handling one or more of ESP transport mode packets, ESP tunnel mode packets, AH transport mode packets, and AH tunnel mode packets.

Hardware Apparatus Supporting IPsec

The IPsec logic and associated components and blocks may also be implemented in hardware. Generally, any form of embedded logic may be used, including pre-programmed circuitry (e.g., Application Specific Integrated Circuits (ASICs), programmable circuitry (e.g., Field Programmable Gate Arrays (FPGAs), and embedded processors executing firmware and/or software.

Figure 10:
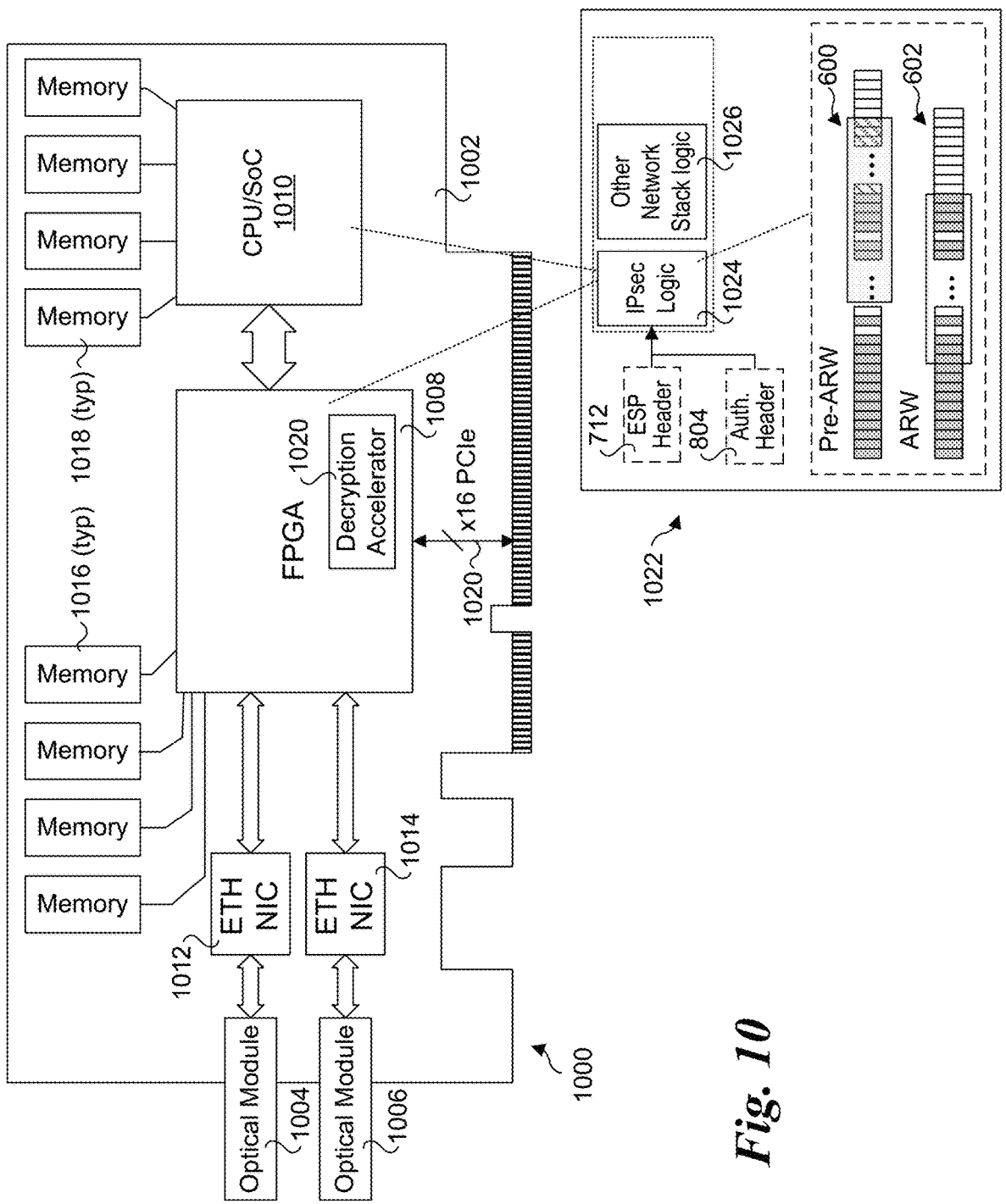
FIG. 10 is schematic diagram of an IPU including in which Ipsec logic is implemented, according to one embodiment.

For example, FIG. 10 shows an infrastructure processor unit (IPU) 1000 in which circuitry and logic for implementing the IPsec protocols described and illustrated above may be implemented. IPU 1000 comprises a Peripheral Component Interconnect Express (PCIe) card including a circuit board 1002 having a PCIe edge connector to which various integrated circuit (IC) chips including a pair of optical modules 1004 and 1006 are mounted. Optical modules 1004 and 1006 include ports configured to be coupled to a network (e.g., an Ethernet network). Optionally, electrical modules and/or ports may be used in place of optical modules 1004 and 1006. The IC chips include an FPGA 1008, a CPU/SoC (System on a Chip) 1010, a pair of Ethernet NICs 1012 and 1014, and memory chips 1016 and 1018. Programmed logic in FPGA 1008 and/or execution of software on CPU/SoC 1010 may be used to implement various IPU functions. FPGA 1008 may include logic that is pre-programmed (e.g., by a manufacturing) and/or logic that is programmed in the field. For example, logic in FPGA 1008 may be programmed by a host CPU for a platform in which IPU 1000 is installed. IPU 1000 may also include other interfaces (not shown) that may be used to program logic in FPGA 1008. Under an optional configuration, the functionality associated with Ethernet NICs 1012 and 1014 is implemented in FPGA 1008 by (pre-) programming associated logic in the FPGA. Optionally, similar functionality may be implemented using an ASIC or an SOC.

CPU/SoC 1010 employs a System on a Chip including multiple processor cores. Various CPU/processor architectures may be used, including but not limited to x86 and ARM® architectures. In one non-limiting example, CPU/SoC 1010 comprises an Intel® Xeon® processor. Software executed on the processor cores may be loaded into memory 1018, either from a storage device (not shown), for a host, or received over a network coupled to enhanced optical module 1004 and 1006.

As shown in a block 1022, various functionality collectively depicted as IPsec logic 1024 may be implemented by programming FPGA 1008, via execution of firmware/software on CPU/SoC 1010, or a combination of the two. IPsec information such as sequence numbers and information from other header fields may be read from an ESP header 712 and an authentication header 804. As an option, other network stack logic 1026 may be implemented in a similar manner. For example, this may include logic for implementing ISO layers above Layer 3, such as providing TCP support (Layer 4).

Figure 11:
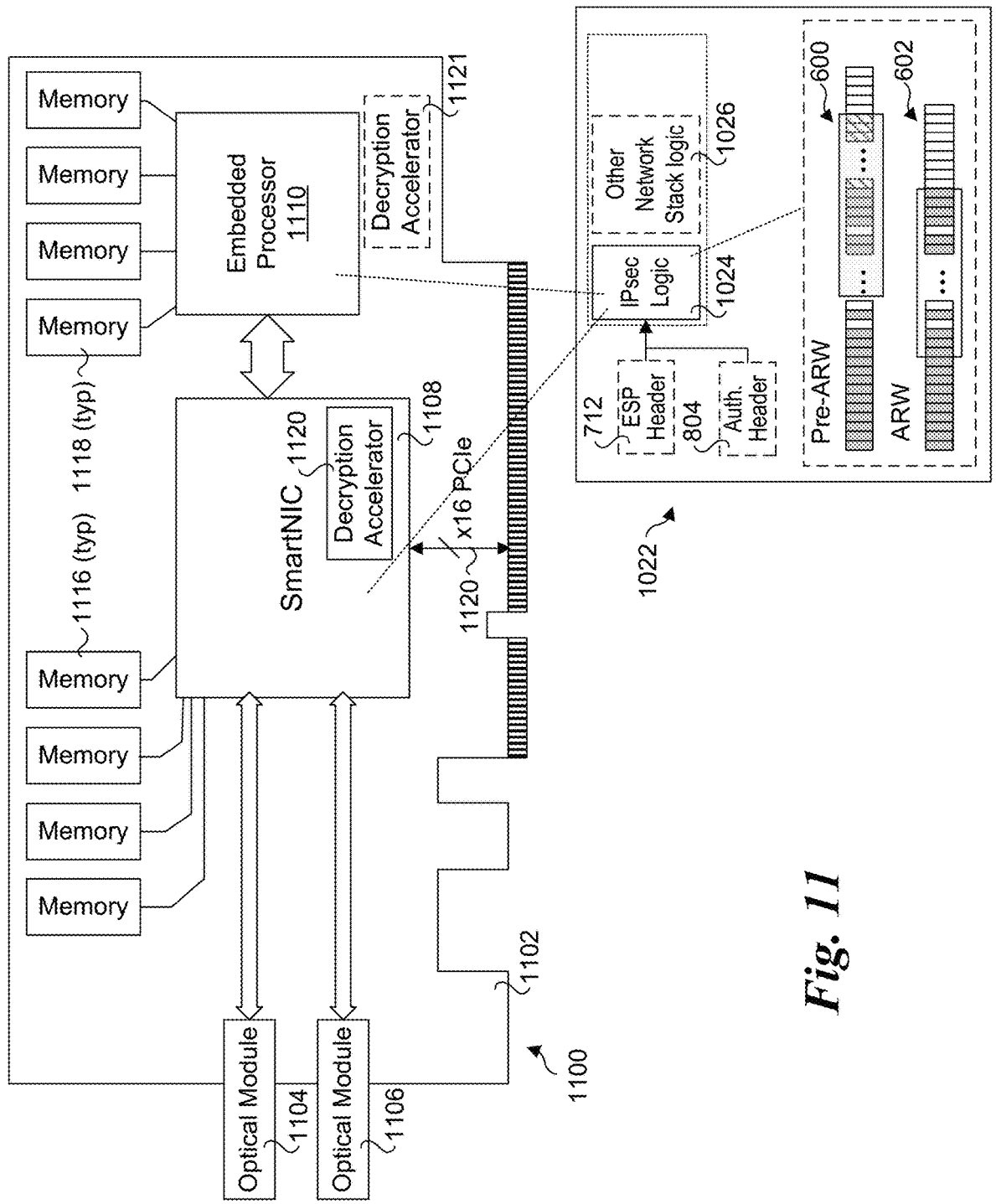
FIG. 11 is a schematic diagram illustrating a smartNIC in which Ipsec logic is implemented.

FIG. 11 shows a SmartNIC 1100 comprising a Peripheral Component Interconnect Express (PCIe) card including a circuit board 1102 having a PCIe edge connector and to which various integrated circuit (IC) chips and components are mounted, including optical modules 1104 and 1106. The IC chips include an SmartNIC chip 1108, an embedded processor 1110 and memory chips 1116 and 1118. SmartNIC chip 1108 is a multi-port Ethernet NIC that is configured to perform various Ethernet NIC functions, as is known in the art. In some embodiments, SmartNIC chip 1108 is an FPGA and/or includes FPGA circuitry. In some embodiments, a portion of the FPGA circuitry may be used to implement a decryption accelerator 1120. Optionally, a separate decryption accelerator 1121 may be provided by SmartNIC 1100.

Generally, SmartNIC chip 1108 may include embedded logic for performing various packet processing operations, such as but not limited to packet classification, flow control, RDMA (Remote Direct Memory Access) operations, an Access Gateway Function (AGF), Virtual Network Functions (VNFs), a User Plane Function (UPF), and other functions. In addition, as shown in a block 1022, various functionality collectively depicted as IPsec logic 1024 may be implemented by programming SmartNIC chip 1108, via pre-programmed logic in SmartNIC chip 1120, via execution of firmware/software on embedded processor 1110, or a combination of the foregoing.

In addition to the functionality shown, each of IPU 1000 and SmartNIC 1100 may be configured to provide similar packet processing functionality shown in FIG. 9 and described above. When implemented in a system that employs some level of software-based packet processing, IPU 1000 and/or SmartNIC 1100 may be configured to DMA packets and their hardware descriptors for non-IPsec packets. This may also apply for IPsec packets, which may be forwarded after such packets have passes decryption and or authentication checks.

In addition to implementation in VPNs, aspects of the embodiments disclosed herein may be implemented a Software Defined Perimeter (SDP) and a Zero Trust Network Access (ZTNA). An SDP is a computer security approach that conceals Internet-connected infrastructure such as servers, routers, and other company assets from being seen by outside parties and attackers, whether on-premises or in the cloud. A ZTNA enables secure remote access to applications and services based on access control regulations. A ZTNA also trusts no user or device and restricts access to network resources even if the user has accessed those same resources previously.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Italicized letters, such as 'j', 'w', 'N', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (e.g., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, FPGAs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for implementing an Internet Protocol Security (IPsec) protocol, comprising:
   implementing a pre-anti-replay window (pre-ARW) block employing a pre-ARW sliding window;
   implementing an ARW block employing an ARW sliding window;
   receiving a packet;
   determining whether the packet passes a pre-ARW check using the pre-ARW sliding window;
   responsive to determining that the packet passes the pre-ARW check,
      decrypting encrypted content in the packet; and
      performing an ARW check using the ARW sliding window.

2. The method of claim 1, further comprising:
   advancing the pre-ARW sliding window when the packet passes the pre-ARW check; and
   advancing the ARW sliding window when the ARW check is passed.

3. The method of claim 1, further comprising:
   in response to determining the packet does not pass the pre-ARW check,
      performing an ARW check on the packet to determine whether the packet is within the ARW sliding window and is not a duplicate packet; and
      when the packet is not within the ARW sliding window or is a duplicate packet, dropping the packet.

4. The method of claim 3, wherein the ARW check comprises
   a first ARW check being performed in response to determining the packet does not pass the pre-ARW check, further comprising:
      when the packet is within the ARW sliding window, buffering the packet in a queue;
      releasing the packet from the queue; and
      performing a second ARW check on the packet to determine whether the packet is within the ARW sliding window and is not a duplicate packet.

5. The method of claim 4, further comprising:
   when the packet is determined to be within the ARW sliding window and is not a duplicate,
      decrypting encrypted content in the packet;
      performing a third ARW check; and
      advancing the ARW sliding window when the third ARW check is passed.

6. The method of claim 1, further comprising periodically performing a timer synchronization between the ARW block and the pre-ARW block.

7. The method of claim 1, wherein the method is performed on a flow of packets, further comprising:
   for individual packets in the flow,
      performing the pre-ARW check and advancing the pre-ARW sliding window using a first atomic operation; and performing the ARW check and advancing the ARW sliding window using a second atomic operation.

8. The method of claim 1, wherein the method is performed on a flow of packets, further comprising performing decryption of encrypted content for multiple packets in parallel.

9. The method of claim 1, further comprising offloading packet decryption operations to a hardware accelerator.

10. The method of claim 1, wherein the pre-ARW block and the ARW block are implemented in an operating system network stack or in a user space library.

11. The method of claim 1, further comprising implementing the method in a virtual private network (VPN), a Software Defined Perimeters (SDP), or a Zero Trust Network Access (ZTNA).

12. A non-transitory machine-readable storage medium having instructions stored thereon configured to be executed by a processor of a computer system having system memory to implement an Internet Protocol Security (IPsec) protocol, wherein execution of the instructions enable the computer system to:
implement a pre-anti-replay window (pre-ARW) block employing a pre-ARW sliding window;
implement an ARW block employing an ARW sliding window;
access a packet buffered in the system memory;
perform a pre-ARW check using the pre-ARW sliding window;
responsive to determining that the packet passes the pre-ARW check,
one of,
decrypt encrypted content in the packet or offload the packet to be decrypted by a hardware accelerator in the computer system; and
perform an ARW check using the ARW sliding window.

13. The non-transitory machine-readable storage medium of claim 12, wherein execution of the instructions further enabled the computer system to:
advance the pre-ARW sliding window when the packet passes the pre-ARW check; and
advance the ARW sliding window when the ARW check is passed.

14. The non-transitory machine-readable storage medium of claim 13, wherein the ARW check comprises a first ARW check, and wherein execution of the instructions further enables the computer system to:
when the packet is within the ARW sliding window, buffer the packet in a queue in the system memory;
release the packet from the queue; and
perform a second ARW check on the packet to determine whether the packet is within the ARW sliding window and is not a duplicate packet.

15. The non-transitory machine-readable storage medium of claim 14, wherein execution of the instructions further enables the computer system to:
when the packet is determined to be within the ARW sliding window and is not a duplicate,
decrypting encrypted content in the packet;
performing a third ARW check; and
advancing the ARW sliding window when the third ARW check is passed.

16. The non-transitory machine-readable storage medium of claim 12, wherein execution of the instructions further enables the computer system to periodically perform a timer synchronization between the ARW block and the pre-ARW block.

17. The non-transitory machine-readable storage medium of claim 12, wherein execution of the instructions further enables the computer system to:
for packets in a packet flow,
perform the pre-ARW check and advance the pre-ARW sliding window using a first atomic block comprising the pre-ARW block; and
perform the ARW check and advance the ARW sliding window using a second atomic block comprising the ARW block.

18. The non-transitory machine-readable storage medium of claim 17, wherein operations are performed on a flow of packets, and wherein execution of the instructions further enables the computer system to perform decryption of encrypted content for multiple packets in the flow of packets in parallel.

19. The non-transitory machine-readable storage medium of claim 17, wherein the computer system comprises a device in one of a virtual private network (VPN), a Software Defined Perimeters (SDP), or a Zero Trust Network Access (ZTNA).

20. An apparatus, comprising:
a pre-anti-replay window (pre-ARW) means employing a pre-ARW sliding window;
a ARW means employing an ARW sliding window; and
decryption means;
wherein the apparatus is configured to,
receive a packet having one or more fields employed by an Internet Protocol Security (IPsec) protocol;
employ the pre-ARW means to determine whether the packet passes a pre-ARW check;
responsive to determining that the packet passes the pre-ARW check,
decrypt encrypted content in the packet using the decryption means; and
perform an ARW check using the ARW sliding window; and
advance the ARW sliding window when the ARW check is passed.

21. The apparatus of claim 20, wherein the apparatus is further configured to:
advance the pre-ARW sliding window when the packet passes the pre-ARW check; and
advance the ARW sliding window when the ARW check is passed.

22. The apparatus of claim 20, wherein the apparatus comprises a computer system including:
system memory;
software including an operating system implementing a network stack;
a processor, coupled to the system memory and used to execute the software; and
a network interface having a network port at which packets are received, operatively coupled to the processor;
wherein the pre-ARW means and the ARW means comprise software components that are part of the network stack.

23. The apparatus of claim 22, further comprising a hardware-based accelerator comprising the decryption means, the hardware-based accelerator being implemented on the network interface or on a separate hardware component operatively coupled to the processor.

24. The apparatus of claim 20, wherein the apparatus comprises a network interface controller (NIC) or an infrastructure processing unit (IPU).

* * * * *